United States Patent
Morimoto et al.

(10) Patent No.: US 7,732,523 B2
(45) Date of Patent: Jun. 8, 2010

(54) ELASTOMER COMPOSITION, METHOD FOR PRODUCING THE SAME, AND ERASER USING THE SAME

(75) Inventors: Kazuki Morimoto, Osaka (JP); Yasuhiro Nishioka, Osaka (JP)

(73) Assignee: Seed Company Ltd., Osaka (JP)

(*) Notice: Subject to any disclaimer, the term of this patent is extended or adjusted under 35 U.S.C. 154(b) by 0 days.

(21) Appl. No.: 12/007,197

(22) Filed: Jan. 8, 2008

(65) Prior Publication Data

US 2008/0182924 A1    Jul. 31, 2008

(30) Foreign Application Priority Data

Jan. 26, 2007  (JP) ............... 2007-016000
Nov. 30, 2007  (JP) ............... 2007-309928

(51) Int. Cl.
  *B42L 19/00* (2006.01)
  *C08G 61/00* (2006.01)
  *C08K 13/02* (2006.01)
  *C08K 5/092* (2006.01)
  *C08K 5/053* (2006.01)
  *C08L 7/00* (2006.01)
  *C08L 3/00* (2006.01)

(52) U.S. Cl. ............... 524/500; 15/424; 524/9; 524/10; 524/80; 524/702; 524/925

(58) Field of Classification Search ............... 524/500, 524/9, 10, 80, 702, 925; 525/50, 54.4, 54.42; 15/424
See application file for complete search history.

(56) References Cited

U.S. PATENT DOCUMENTS 4,393,022 A * 7/1983 Handl .................. 264/148
4,796,328 A * 1/1989 Horie .................... 15/424
5,922,832 A * 7/1999 Randall et al. ........... 528/354

FOREIGN PATENT DOCUMENTS

| JP | 10-274494 | 10/1998 |
|----|-----------|---------|
| JP | 2000-043492 | 2/2000 |
| JP | 2000-095898 | 4/2000 |
| JP | 2000-159936 | 6/2000 |
| JP | 2000-319446 | 11/2000 |
| JP | 2003-183488 | 7/2003 |
| JP | 2003-292679 | 10/2003 |
| JP | 2004-143315 | 5/2004 |
| JP | 2004143315 A * | 5/2004 |
| JP | 2005-154586 | 6/2005 |
| JP | 2005255722 A * | 9/2005 |

OTHER PUBLICATIONS

Machine Translation of JP 2005255722 A (2005).*
Machine Translation of JP 2004143315 (2004).*
Internationl Search Report dated Mar. 11, 2008.

* cited by examiner

*Primary Examiner*—Milton I Cano
*Assistant Examiner*—Darcy D LaClair
(74) *Attorney, Agent, or Firm*—Sughrue Mion, PLLC

(57) ABSTRACT

An elastomer composition is provided which contains a matrix of poly-(3-hydroxybutyrate-co-3-hydroxyhexanoate) produced from microorganisms and crosslinked natural rubber particles dispersed like islands in the matrix. An eraser using the elastomer composition is also provided. The present invention is capable of providing an elastomer composition and eraser using the same, which can be recycled, are friendly to the environment, and corresponds to the recycling society, without relying on fossil resources.

24 Claims, No Drawings

ELASTOMER COMPOSITION, METHOD FOR PRODUCING THE SAME, AND ERASER USING THE SAME

BACKGROUND OF THE INVENTION

1. Field of the Invention

The present invention relates to an elastomer composition, a method for producing the same, and an eraser using the same, and more particularly to an elastomer composition, which can be recycled, is friendly to the environment, and corresponds to the recycling society, without relying on fossil resources, a method for producing the same, and an eraser using the same.

2. Description of the Prior Art

So far, industries and economies have been advanced using fossil resources such as coal and petroleum oil and social systems based on mass production, mass consumption, and mass disposal have been established and many daily necessities have been based on the fossil resources whose depletion is now expected.

The present social systems have created economical affluence and convenience, but, on the other hand, wastes and carbon dioxide exceeding the natural purification capabilities have been discharged and it has resulted in serious environmental issues such as global warming and harmful substance generation.

In order to solve such problems, it is urgently required to reform today's one-way type social systems, in which a large quantity of commodities are produced from limited resources, consumed and disposed, and to shift the social systems to the recycling society, in which discharge of wastes can be suppressed and the limited resources can be advantageously utilized. To establish this recycling society, in our country, "Biomass Nippon Strategy" was decided upon by the Japanese government at a cabinet meeting held in December, 2002 and Japan has now been challenging reconstruction of the industrial competitive strength.

Biomass is sustainable and regenerable organic resources brought forth by natural blessings. Although biomass emits carbon dioxide when burned, carbon dioxide in atmospheric air is absorbed and fixed by photosynthesis at the time of plant growth and therefore biomass has a characteristic that it does not practically increase carbon dioxide. This is called "carbon neutral" and replacement of energy and commodities derived from fossil resources with biomass makes it possible to considerably lessen the carbon dioxide emission and accordingly, the techniques and product developments therefor have been acutely required.

In recent years, with respect to polymer materials as well, a plenty of proposals have been made in consideration of establishment of recycling society.

For instance, Japanese Patent Application Laid-Open (JP-A) No. 10-274494 describes a composition for rubber production containing natural rubber and biodegradable plastics (in Examples, a vulcanizing agent and a vulcanization accelerator are used). JP-A No. 2000-95898 describes a biodegradable material composition obtained by mixing a biodegradable material, epoxylated polyisoprene, and if necessary a crosslinking agent. JP-A No. 2000-319446 describes a biodegradable rubber composition obtained by adding a biodegradable resin and a filler to natural rubber. Further, JP-A No. 2003-183488 describes a polylactic acid type resin composition containing crystalline polylactic acid, and a rubber component selected from natural rubber and polyisoprene, and JP-A No. 2004-143315 describes a polymer blended material containing a continuous phase of polylactic acid and a dispersion phase of natural rubber or the like, evenly and finely dispersed in the continuous phase.

On the other hand, erasers can be broadly classified into three types: a vinyl chloride type eraser made of a vinyl chloride resin; a non-vinyl chloride type eraser made of a styrene type thermoplastic elastomer or an olefin type thermoplastic elastomer; and a natural rubber eraser.

Among them, more than 90% of erasers in an eraser market are a vinyl chloride type eraser and a non-vinyl chloride type eraser. The polymer material, a plasticizer, and a softening agent composing the erasers are all materials derived from fossil resources such as petroleum oil and continuous use of these erasers is contradictory to the theme of the recycling society establishment.

On the other hand, for instance, as described in JP-A No. 2000-43492 and Gomu Kogyo Binran (Rubber Industry Handbook) (new edition, edited by The Society of Rubber Industry, Japan, published by The Society of Rubber Industry, Japan, Nov. 15, 1973, p. 817, Table 25.2), natural rubber erasers utilize biomass such as subs (factices) produced from natural rubber and plant oils and is in accord with the theme of the recycling society establishment.

However, in the above-mentioned conventional techniques, those obtained without vulcanizing or crosslinking rubber are insufficient in tensile strength or elasticity and therefore applications thereof are sometimes limited and, for instance, they are inadequate as materials for erasers since they do not exhibit rubber elasticity. On the other hand, those which are vulcanized or crosslinked are also sometimes limited in applications because of excess tensile strength and elasticity and for instance, they become too hard as materials for erasers to give rubber elasticity and therefore inadequate. Further, since a vulcanizing or crosslinking step is necessary, the production process not only becomes complicated but also contains critical issue of safety of sulfur as a vulcanization agent and vulcanization chemical agents such as a vulcanization accelerator and an aid such as zinc oxide.

On the other hand, as described above, although the natural rubber erasers are suitable for satisfying the need for recycling society establishment, the natural rubber erasers are inferior in the erasing capability as compared with the vinyl chloride type erasers and since their production process includes a vulcanization step, the production process is complicated as compared with that for the vinyl chloride type erasers or non-vinyl chloride type erasers. Further, as described above, there is an issue of safety of sulfur and vulcanization chemical agents such as a vulcanization accelerator. Moreover, reuse of wastes generated in the production process is difficult, so that it could result in uneconomical consequence and a problem in terms of productivity.

SUMMARY OF THE INVENTION

In view of the above state of the art, it is an object of the present invention to solve the above-mentioned problems of the conventional techniques and to provide an elastomer composition provided with physical properties such as tensile strength and elasticity, which have never been obtained by conventional vulcanization or crosslinking, containing a matrix of a biomass plastic and crosslinked natural rubber particles dispersed like islands in the matrix; a method for producing the elastomer composition including kneading the biomass plastic, natural rubber, and a rubber crosslinking agent at a temperature not lower than the melting temperature of the biomass plastic and not lower than the crosslinking temperature of the rubber crosslinking agent and dispersing the crosslinked natural rubber particles like islands in the matrix of the biomass plastic; and an eraser using the elastomer composition.

DETAILED DESCRIPTION OF THE INVENTION

The present invention has accomplished the above-mentioned object and a first aspect of the present invention is an elastomer composition containing a matrix of a biomass plastic and crosslinked natural rubber particles dispersed like islands in the matrix.

A second aspect of the present invention is the elastomer composition of the first aspect, in which the biomass plastic is at least one kind compound selected from polylactic acid, polybutylene succinate, polyamide 11, poly-3-hydroxybutyrate, cellulose acetate, esterified starch, chitosan-cellulose-starch and starch-modified polyvinyl alcohol.

A third aspect of the present invention is the elastomer composition of the first aspect, in which the biomass plastic is a biodegradable biomass plastic.

A fourth aspect of the present invention is a method for producing an elastomer composition comprising the steps of, kneading a biomass plastic, natural rubber, and a rubber crosslinking agent at a temperature not lower than the melting temperature of the biomass plastic and not lower than the crosslinking temperature of the rubber crosslinking agent and dispersing crosslinked natural rubber particles like islands in the matrix of the biomass plastic.

A fifth aspect of the present invention is the elastomer composition production method of the fourth aspect, in which the biomass plastic is at least one kind compound selected from polylactic acid, polybutylene succinate, polyamide 11, poly-3-hydroxybutyrate, cellulose acetate, esterified starch, chitosan-cellulose-starch and starch-modified polyvinyl alcohol.

A sixth aspect of the present invention is the elastomer composition production method of the fourth aspect, in which the biomass plastic is a biodegradable biomass plastic.

A seventh aspect of the present invention is an eraser of an elastomer composition containing a matrix of a biomass plastic and crosslinked natural rubber particles dispersed like islands in the matrix of the biomass plastic.

An eighth aspect of the present invention is the eraser of the seventh aspect, in which the biomass plastic is at least one kind compound selected from polylactic acid, polybutylene succinate, polyamide 11, poly-3-hydroxybutyrate, cellulose acetate, esterified starch, chitosan-cellulose-starch and starch-modified polyvinyl alcohol.

A ninth aspect of the present invention is the eraser of the seventh aspect, in which the biomass plastic is a biodegradable biomass plastic.

A tenth aspect of the present invention is the eraser of any one of the seventh to ninth aspects, in which the elastomer composition is an eraser composition containing 50 to 99% by weight of natural rubber, 50 to 1% by weight of a biomass plastic, and 0.1 to 5 parts by weight of a rubber crosslinking agent to 100 parts by weight of the natural rubber.

An eleventh aspect of the present invention is the eraser of any one of the seventh to tenth aspects, which further contains a softening agent.

A twelfth aspect of the present invention is the eraser of the eleventh aspect, in which the softening agent is derived from biomass.

A thirteenth aspect of the present invention is the eraser of the eleventh or twelfth aspect, in which the softening agent is selected from animal and plant oils and a plasticizer derived from these oils.

A fourteenth aspect of the present invention is the eraser of any one of the eleventh to thirteenth aspects, in which the amount of the softening agent is 1 to 200 parts by weight to 100 parts by weight of the total of the natural rubber and biomass plastic.

A fifteenth aspect of the present invention is the eraser of any one of the seventh to fourteenth aspects, which further contains a filler.

A sixteenth aspect of the present invention is the eraser of the fifteenth aspect, in which the filler is derived from biomass.

A seventeenth aspect of the present invention is the eraser of the fifteenth or sixteenth aspect, in which the filler is selected from a shell powder and an eggshell powder.

A eighteenth aspect of the present invention is the eraser of any one of the fifteenth to seventeeth aspects, in which the amount of the filler is 10 to 1000 parts by weight to 100 parts by weight of the total of the natural rubber and biomass plastic.

A nineteenth aspect of the present invention is an eraser comprising an elastomer containing a matrix of a biomass plastic and crosslinked natural rubber particles dispersed like islands in the matrix and a vinyl chloride resin.

A twentieth aspect of the present invention is the eraser of the nineteenth aspect, in which the biomass plastic is at least one kind compound selected from polylactic acid, polybutylene succinate, polyamide 11, poly-3-hydroxybutyrate, cellulose acetate, esterified starch, chitosan-cellulose-starch and starch-modified polyvinyl alcohol.

A twenty-first aspect of the present invention is the eraser of the nineteenth aspect, in which the biomass plastic is a biodegradable biomass plastic.

A twenty-second aspect of the present invention is the eraser of any one of the nineteenth to twenty-first aspects, in which the elastomer is an eraser composition containing 50 to 99% by weight of natural rubber, 50 to 1% by weight of a biomass plastic, and 0.1 to 5 parts by weight of a rubber crosslinking agent to 100 parts by weight of the natural rubber.

A twenty-third aspect of the present invention is the eraser of the twenty-second aspect which further contains a softening agent.

A twenty-fourth aspect of the present invention is the eraser of the twenty-third aspect, in which the softening agent is derived from biomass.

A twenty-fifth aspect of the present invention is the eraser of the twenty-third or twenty-fourth aspect, in which the softening agent is selected from animal and plant oils and a plasticizer derived from these oils.

A twenty-sixth aspect of the present invention is the eraser of any one of the twenty-third to twenty-fifth aspects, in which the amount of the softening agent is 1 to 200 parts by weight to 100 parts by weight of the total of the natural rubber and biomass plastic.

A twenty-seventh aspect of the present invention is the eraser of any one of the twenty-second to twenty-sixth aspects, which further contains a filler.

A twenty-eighth aspect of the present invention is the eraser of the twenty-seventh aspect, in which the filler is derived from biomass.

A twenty-ninth aspect of the present invention is the eraser of the twenty-seventh or twenty-eighth aspect, in which the filler is selected from a shell powder and an eggshell powder.

A thirtieth aspect of the present invention is the eraser of any one of the twenty-seventh to twenty-ninth aspects, in which the amount of the filler is 10 to 1000 parts by weight to 100 parts by weight of the total of the natural rubber and biomass plastic.

A thirty-first aspect of the present invention is the eraser of any one of the nineteenth to thirtieth aspects, in which the vinyl chloride resin is a vinyl chloride resin eraser composition containing 100 parts by weight of a vinyl chloride resin and 60 to 180 parts by weight of a plasticizer.

A thirty-second aspect of the present invention is a method for producing an eraser comprising the steps of; melting and kneading an eraser of an elastomer eraser composition and an eraser of a vinyl chloride resin eraser composition and molding the kneaded mixture.

A thirty-third aspect of the present invention is the eraser production method of the thirty-second aspect, in which the elastomer eraser composition contains 50 to 99% by weight of natural rubber, 50 to 1% by weight of a biomass plastic, and 0.1 to 5 parts by weight of a rubber crosslinking agent to 100 parts by weight of the natural rubber.

A thirty-fourth aspect of the present invention is the eraser production method of the thirty-second or thirty-third aspect, in which the vinyl chloride resin eraser composition contains 100 parts by weight of a vinyl chloride resin and 60 to 180 parts by weight of a plasticizer.

A thirty-fifth aspect of the present invention is the eraser production method of any one of the thirty-second to thirty-fourth aspects, in which the amount of the eraser of the elastomer eraser composition is 30 to 90% by weight and the amount of the vinyl chloride resin eraser composition is 70 to 10% by weight.

With respect to the elastomer compositions of the present invention, the materials to be used as raw materials not relying on the fossil resources are all natural rubber and biomass plastics derived from biomass and accordingly, even if they are disposed, carbon dioxide in the atmospheric air is not increased and thus they are elastomer compositions, which are friendly to the environment. Further, biodegradable plastics are used as the biomass plastics, so that it can be made possible to provide further environmentally adequate elastomer compositions which are decomposed in natural environments.

Further, since the elastomer compositions of the present invention are thermoplastic elastomers, the refuse generated at the time of molding can be easily recycled and accordingly, it leads to cost down and is thus adequate to the resource recycling society.

Further, in the elastomer composition production methods of the present invention, since kneading of natural rubber and biomass plastics and crosslinking of the natural rubber are simultaneously carried out, the process can be simplified and the productivity is high. Further, vulcanization agents and vulcanization accelerators such as sulfur and zinc oxide are not used for crosslinking the natural rubber, the safety is also high.

The elastomer compositions of the present invention differ from materials obtained by the conventional vulcanization or crosslinking and are therefore suitable, for instance, for base materials of erasers.

The erasers of the elastomer compositions of the present invention are friendly to the environment, being different from the conventional vinyl chloride erasers and non-vinyl chloride erasers which rely on fossil resources and the refuse generated at the time of molding is easily recycled and vain loss of materials is suppressed to result in cost down.

Further, with respect to the conventional natural rubber erasers, a crosslinking step is required in addition to a kneading step whereas kneading and crosslinking are carried out simultaneously in the present invention and the steps are simplified to increase the productivity.

Further, with respect to the conventional natural rubber erasers, vulcanization agents and vulcanization accelerators such as sulfur and zinc oxide are used whereas such chemical agents are not used for the erasers of the present invention and therefore the safety is high.

Moreover, the erasers of the present invention are provided with high erasing capability as compared with the conventional natural rubber erasers and non-vinyl chloride erasers.

Furthermore, the erasers made of the elastomer compositions of the present invention, if vinyl chloride resin, preferably an eraser made of the vinyl chloride resin composition is further contained, the dependency on fossil resources can be lessened and the erasing capability can be further improved.

The elastomer compositions of the present invention are characterized in that the compositions have a sea-island structure in which a matrix (sea) of a biomass plastic, crosslinked natural rubber particles are dispersed like islands in the matrix.

The natural rubber to be used in the present invention can be classified into sheet rubber, pale crepe, brown crepe, blanket crepe, block rubber, and crumb rubber, according to a method for processing the rubber from latex into solid type rubber, and various ranking grades are made available, and any natural rubber may be used regardless of production areas. Further, natural rubber derivatives, for example, epoxylated natural rubber, may also be used. They may be used alone or if necessary, two or more types may be used in combination.

The biomass plastics to be used in the present invention can be classified into a chemical synthesis type, a microorganism production type, and natural type. The chemical synthesis type may include polylactic acid resins (e.g. LACEA®, manufactured by Mitsui Chemicals, Inc.) obtained by polymerizing lactic acid which is produced by fermenting saccharides and starch derived from corn, potato and sugarcane; polybutylene succinate (e.g. GS-Pla, manufactured by Mitsubishi Chemical Corporation) produced from succinic acid derived from starch and 1,4-butane diol as a raw material; and polyamide 11 (e.g. Rilsan® B, manufactured by ARKEMA) produced from castor oil as a raw material. The microorganism production type may include poly-3-hydroxybutyrate (e.g. Biogreen, manufactured by Mitsubishi Gas Chemical Company, INC.). The natural type may include cellulose acetate (e.g. CELGREEN PCA, manufactured by Daicel Chemical Industries, Ltd.); esterified starch (e.g. Cornpole, manufactured by Nihon Cornstarch Corporation), chitosan-cellulose-starch (e.g. Dolon CC, manufactured by Aicello Chemical Co., Ltd.); starch-modified polyvinyl alcohol (e.g. Mater-Bi, manufactured by Novamont). They may be used alone or if necessary, two or more kinds of them may be used in combination.

Use of biodegradable materials, which are regenerable resources, as biomass plastics makes it possible to obtain further improved environmentally friendly elastomer compositions.

The composition ratio of the natural rubber and biomass plastics may be properly determined in accordance with applications and physical properties of the aimed elastomer compositions, however, for base materials of erasers, the natural rubber is preferably in a range of 50 to 99% by weight and the biomass plastics in a range of 50 to 1% by weight; the natural rubber is more preferably in a range of 70 to 95% by weight and the biomass plastics in a range of 30 to 5% by weight. If the biomass plastics are less than 1% by weight, the fluidity of the elastomer compositions is worsened to cause a problem of moldability. If the biomass plastics exceed 50% by weight, the elastomer compositions become too hard to exhibit rubber elasticity, and for instance, in the case of using them as base materials for erasers, it tends to become difficult to obtain a sufficient erasing capability.

The rubber crosslinking agents to be used preferably in the present invention may be organic peroxides. Practical examples are dicumyl peroxide (e.g. PERCUMYL® D, manufactured by NOF Corporation), 2,5-dimethyl-2,5-di-tert-butyl peroxyhexane (e.g. PERHEXA 25 B, manufactured by NOF Corporation), di-tert-butylperoxydiisopropylbenzene (e.g. PERBUTYL P, manufactured by NOF Corporation), and 2,5-dimethyl-2,5-di-tert-butylperoxyhexyne-3 (e.g. PERHEXYNE® 25 B, manufactured by NOF Corporation). Additionally, other organic vulcanization agents may also be used. Practical examples are N,N'-m-phenylene dimaleimide (e.g. VULNOC PM, manufactured by Ouchi Shinko Chemical Industrial Co., Ltd.), p-quinonedioxime (e.g. VULNOC GM, manufactured by Ouchi Shinko Chemical Industrial Co., Ltd.), and alkylphenol-formaldehyde resin (e.g. TACKROL® 201, manufactured by Taoka Chemical Co., Ltd.). They may be used alone or if necessary, two or more kinds of them may be used in combination.

The rubber crosslinking agents may be used in an amount of 0.1 to 5.0 parts by weight to 100 parts by weight of natural rubber. If the amount of the rubber crosslinking agents is less than 0.1 part by weight, the crosslinking becomes insufficient and the natural rubber does not become particles, and therefore, it becomes impossible to obtain an aimed structure and on the other hand, if the amount exceeds 5.0 parts by weight, the impact resilience of the crosslinked rubber particles tends to become so high to cause a problem of moldability.

The elastomer compositions of the present invention may contain various kinds of additives to be used in fields of biomass plastic materials and natural rubber materials. Examples of such additives are ultraviolet absorbents, hindered amine type photo-stabilizers, weathering resistance improvers such as antioxidants, and lubricants of such as higher fatty acid alcohols, aliphatic amides, metal soaps, and fatty acid esters.

Each elastomer composition of the present invention can be obtained by putting a biomass plastic, natural rubber, a rubber crosslinking agent, and if necessary, a softening agent, and a filler in a kneader and kneading them at a temperature not lower than the melting temperature of the biomass plastic and not lower than the crosslinking temperature of the rubber crosslinking agent.

The kneading is preferable to be carried out under high shearing condition. Examples of such a kneader may be a biaxial kneading extruder, a Bambury mixer, a pressurizing kneader, and a mixing roll and among them is preferably the biaxial kneading extruder.

The word "a temperature not lower than the melting temperature of the biomass plastics" preferably means a temperature higher than the melting temperature of the biomass plastic by 10 to 50° C. and the word "a temperature not lower than the crosslinking temperature of the rubber crosslinking agent" preferably means a temperature higher than the crosslinking temperature of the rubber crosslinking agent by 5 to 20° C.

The elastomer compositions of the present invention have excellent elasticity and cushioning property and are thus useful for cushioning materials for wrapping, heat insulators, sound insulators, sound absorbing materials, tatami mat beds, floor materials and wall materials and particularly useful for base materials for erasers.

A reason for that the elastomer compositions of the present invention has such unique physical properties as compared with conventionally vulcanized or crosslinked compositions is supposedly attributed to that the rubber component is cut in the course of kneading.

In the case where the elastomer compositions of the present invention are used as base materials for erasers, other additives such as a softening agent, a filler, an organic or inorganic pigment, a coloring material such as dyes, a fragrance, a stabilizer, an antioxidant, a UV absorbent, and an anti-mold agent may be arbitrarily added to give elastomer eraser compositions.

Examples of the softening agent may be mineral oils, animal and plant oils, and plasticizers derived from them.

Practical examples of the mineral oils are paraffin type process oil, naphthene type process oil, and aromatic type process oil. Practical examples of the animal and plant oils are rapeseed oil, rapeseed refined oil, castor oil, cotton seed oil, linseed oil, soy oil, sesame oil, corn oil, safflower oil, palm oil, coconut oil, peanut oil, Japan tallow, rosin, pine tar, and tall oil. Plasticizers derived from animal and plant oils may include glycerin fatty acid esters and practical examples may be glycerin diacetomonolaurate, glycerin triacetate, and glycerol diacetate. They may be used alone or if necessary two or more of them may be used in combination. In terms of availability of elastomer compositions with further improved environmental friendliness, animal and plant oils derived from biomass, which are regenerable resources, or plasticizers derived from them are more preferable to be used.

The addition amount of the softening agent is 1 to 200 parts by weight to 100 parts by weight of a mixture of the natural rubber and biomass plastics. It is preferably 10 to 150 parts by weight. If the softening agent is less than 1 part by weight, the addition amount of the softening agent is insufficient and on the other hand, if it exceeds 200 parts by weight, it may possibly result in occurrence of bleeding.

Examples of the fillers may be heavy calcium carbonate, light calcium carbonate, silica, diatomaceous earth, magnesium oxide, titanium oxide, talc, sericite, quartz powder, montmorillonite, shell powder of scallop, oyster, and freshwater clam, eggshell powder, organic hollow particles, and inorganic hollow particles. They may be used alone or if necessary, two or more of them may be used in combination. In terms of availability of elastomer compositions with further improved environmental friendliness, shell powders of scallop and oyster and eggshell powder derived from biomass, which are generated in a large quantity as wastes, are more preferable to be used.

The addition amount of the filler is 10 to 1000 parts by weight to 100 parts by weight of a mixture of the natural rubber and biomass plastics. It is preferably 50 to 500 parts by weight. If the filler is less than 10 parts by weight, the addition amount of the filler is insufficient and on the other hand, if it exceeds 1000 parts by weight, the composition may possibly become hard and no sufficient rubber elasticity can be exhibited, and in the case of using the composition as a base material for an eraser, it tends to become difficult to obtain sufficient erasing capability.

The erasers of the present invention using the above-mentioned elastomer eraser compositions are obtained by molding the elastomer eraser compositions by press molding, injection molding, and extrusion molding or the like, and cutting molded products into prescribed sizes to give erasers of elastomers.

The erasers of elastomers (hereinafter, referred to as an elastomer eraser) obtained in the above-mentioned manner can be improved in the erasing capability by further adding a vinyl chloride resin, preferably, an eraser of a vinyl chloride resin (hereinafter, referred to as a vinyl chloride resin eraser).

Such erasers with higher erasing capability can be obtained by melting and kneading an elastomer and a vinyl chloride resin with other additives such as a softening agent, a filler, a plasticizer, a coloring agent, and a fragrance and molding the mixture, however, it is more preferable to mix the above-mentioned elastomer eraser and vinyl chloride resin eraser and to melt and knead the mixture since it can more efficiently improve the erasing capability. Accordingly, this preferable method will be described below.

The vinyl chloride resin to be used for the vinyl chloride resin eraser in the present invention is not particularly limited and conventionally known vinyl chloride resins are used, and the both paste resin and straight resin may be used. A plasticizer may be added to the vinyl chloride resin and further based on the necessity, additives such as a stabilizer, a coloring agent, and a fragrance may also be added arbitrarily.

Examples of the plasticizer may include phthalic acid ester type plasticizers such as dioctyl phthalate (DOP), dinonyl phthalate (DNP), diisononyl phthalate (DINP), diisodecyl phthalate (DIDP), ditridecyl phthalate (DTDP), and diundecyl phthalate (DUP); trimellitic acid ester type plasticizers such as diisooctyl trimellitate (TIOTM); and polyester type plasticizers, and they may be used alone or if necessary, two or more kinds of them may be used in combination.

The addition amount of the plasticizer is 60 to 180 parts by weight and preferably 100 to 160 parts by weight to 100 parts by weight of the vinyl chloride resin. If it is less than 100 parts by weight, the composition may possibly become so hard to exhibit a sufficient erasing capability and on the other hand, if it exceeds 160 parts by weight, it may possibly result in occurrence of bleeding.

In the cases of a paste resin, an eraser composition containing the paste resin, a plasticizer and if necessary other additives is kneaded and defoamed and thereafter, the composition is poured into a metal mold for molding with a prescribed depth, heated for a prescribed time and then cooled, then taken out of the metal mold and cut into prescribed size to obtain erasers.

On the other hand, in the case of a straight resin, an eraser composition containing the straight resin, a plasticizer and if necessary other additives is molded by an injection molding machine, an extrusion molding machine or the like and cut into prescribed size to obtain erasers.

As described above, the elastomer erasers and the vinyl chloride resin erasers are mixed at a prescribed ratio and kneaded by a heated kneader and cooled, and successively crushed into pellets and then the pellets are molded by injection molding, extrusion molding or the like and cut into prescribed size to obtain highly erasing erasers of the present invention.

The mixing ratio of the elastomer erasers and vinyl chloride resin erasers is not particularly limited and in the case recycling and lessening of a load on environments are considered to be more important, the ratio of the former, namely, the elastomer erasers, is increased and on the other hand, if the erasing capability is considered to be more important, the ratio of the latter, namely, the vinyl chloride resin erasers, may be increased, however, if the ratio of the vinyl chloride resin eraser is too little, the effect of improving the erasing capability, which is an aim of this invention, becomes slight. Accordingly, the elastomer erasers are preferably in a range of 30 to 90% by weight and the vinyl chloride resin erasers are in a range of 70 to 10% by weight and the elastomer erasers are more preferably in a range of 30 to 80% by weight and the vinyl chloride resin erasers are in a range of 70 to 20% by weight. Even if the ratio of the vinyl chloride resin erasers exceeds 70% by weight, the erasing capability becomes approximately constant and the load on the environments tends to be increased.

Hereinafter, the present invention will be explained more in detail with reference to Examples, Reference Examples, and Comparative Examples; however it is not intended that the present invention be limited to them.

Materials employed in the following Examples, Reference Examples and Comparative Examples are shown in Table 1.

TABLE 1

| Product name | Material name | Maker |
| --- | --- | --- |
| RSS#1 | natural rubber | Produced in Indonesia |
| LACEA ® H-100 | biomass plastics: polylactic acid (melting temperature: 164° C.) | Mitsui Chemicals, Inc. |
| GS Pla | biomass plastic: polybutylene succinate (melting temperature: 112° C.) | Mitsubishi Chemical Corporation |
| Rapeseed refined oil | softening agent: plant oil | Cosmo Yuka Co., Ltd. |
| RIKEMAL PL-004 | softening agent: glycerin diacetomonolaurate | Riken Vitamin Co., Ltd. |
| SS#80 | filler: heavy calcium carbonate | Nitto Funka Kogyo K.K. |
| Scallop shell powder | filler: scallop shell crushed powder | Nitto Funka Kogyo K.K. |
| PERCUMYL ® D-40 | rubber crosslinking agent: 40% diluted product of dicumyl peroxide (crosslinking temperature: 150~180° C.) | NOF Corporation |
| VULNOC PM | rubber crosslinking agent: N,N'-m-phenylenedimaleimide (crosslinking temperature: 150~190° C.) | Ouchi Shinko Chemical Industrial Co., Ltd. |
| White Sub No. 1 | substitute: sulfur chloride factice | Tenma Factice Manufacturing Co., Ltd. |
| DIANA PROCESS OIL NP-24 | softening agent: naphthenic type process oil | Idemitsu Kosan Co., Ltd. |
| Sulfax 200S | vulcanization agent: sulfur powder | Tsurumi Chemical Industry Co., Ltd. |
| NOCCELER TT | thiuram type vulcanization accelerator | Ouchi Shinko Chemical Industrial Co., Ltd. |
| NOCCELER DM | thiazole type vulcanization accelerator | Ouchi Shinko Chemical Industrial Co., Ltd. |
| NOCCELER BG | guanidine type vulcanization accelerator | Ouchi Shinko Chemical Industrial Co., Ltd. |
| Zinc oxide | zinc oxide | Sakai Chemical Industry Co., Ltd. |
| ZEST P-21 | vinyl chloride resin | Shin Dai-Ichi Vinyl Corporation |
| DOP | plasticizer: dioctyl phthalate | J-Plus Co., Ltd. |
| NS#400 | filler: heavy calcium carbonate | Nitto Funka Kogyo K.K. |
| ES-A | stabilizer: calcium stearate | Namariichi Chemical Industrial Co., Ltd. |
| ES-Z | stabilizer: zinc stearate | Namariichi Chemical Industrial Co., Ltd. |

EXAMPLES 1 TO 11

The natural rubber, softening agents, and fillers among the materials shown in Table 2 were previously kneaded by a pressurizing kneader and the rubber crosslinking agents were added using rolls to obtain kneaded rubber materials. The obtained kneaded rubber materials were cut into pellets with about 5 mm square. Next, using a biaxial extruder KZW-15TW-60 (completely intermeshed type in same directions, screw diameter 15 mm, L/D=60) manufactured by Technovel Corporation, the kneaded rubber pellets and biomass plastic pellets were supplied at the mixing ratio as shown in Table 2 by respective quantitative supplying units and kneaded at a screw rotation speed of 400 rpm. The cylinder temperature was set at 120 to 190° C., so that the kneading temperature was adjusted not lower than the melting point (170° C.) of the biomass plastics and not lower than the rubber crosslinking temperature (180° C.).

The obtained composition pellets were extrusion-molded into a square rod-like shape by a uniaxial extruder (cylinder temperature 90 to 110° C., and head temperature 120° C.) and cut into elastomer erasers (size: 12×18×43 mm).

As the properties of the erasers were evaluated hardness and erasing capability (erasing ratio). The results are shown in Table 2.

The hardness was measured using C type hardness meter (Type C hardness meter, manufactured by Kobunshi Keiki Co., Ltd.) according to JIS S 6050 Plastic Erasers.

The erasing ratio was measured by the following method.

(1) A test specimen was obtained by cutting each sample into a 5 mm-thick plate-like piece and finishing the part to be brought into contact with testing paper to be an arc shape with a radius of 6 mm.

(2) The test specimen was brought into contact with colored paper perpendicularly and at right angles to colored lines and while a weight to be 0.5 kg in total of the weight and the weight of a holder was put on the test specimen, the test specimen was reciprocated 4 times on the colored part at 150±10 cm/min for erasing the colored part.

(3) The densities of the colored part and the erased part were measured by a densitometer (DENSITOMETER PDA 65, manufactured by Sakura Co.) on the basis of the density, which was set 0, of non-colored parts of the colored paper.

(4) The erasing ratio was calculated according to the following equation.

Erasing ratio(%)=(1−(density of erased part÷density of colored part))×100

COMPARATIVE EXAMPLE 1

Using the materials shown in Table 3, all of the addition materials were kneaded with natural rubber using two rolls to obtain a kneaded rubber material. The obtained kneaded rubber material was previously molded corresponding to the prescribed size of a metal mold and vulcanized and molded using a heat press at 130° C. for 20 minutes. The obtained molded rubber product was cut into prescribed size to obtain a natural rubber eraser (size: 12×18×43 mm).

The hardness and the erasing ratio of the obtained eraser were measured and evaluated in the same methods as in Examples 1 to 11. The results are shown in Table 3.

TABLE 3

| | Composition | Comparative Example 1 |
|---|---|---|
| Natural rubber | RSS#1 | 100 |
| Substitute | White sub No. 1 | 300 |
| Filler | SS#80 | 400 |
| Softening agent | DIANA PROCESS OIL NP-24 | 150 |
| Vulcanization agent | Sulfax 200S | 4 |
| Vulcanization accelerator | NOCCELER TT | 1 |
| | NOCCELER DM | 0.5 |
| | NOCCELER BG | 0.5 |
| Vulcanization aid | zinc oxide | 5 |
| Properties | Hardness (C type) | 60 |
| | Erasing ratio (%) | 90 |

REFERENCE EXAMPLES 1 AND 2

Production of Elastomer Eraser

The natural rubber, softening agents, and fillers among the materials shown in Table 4 were previously kneaded by a pressurizing kneader and the rubber crosslinking agent was added using rolls to obtain kneaded rubber materials. The obtained kneaded rubber materials were cut into pellets with about 5 mm square. Next, using a biaxial extruder KZW-15TW-60 (completely intermeshed type in same directions, screw diameter 15 mm, L/D=60) manufactured by Technovel Corporation, the kneaded rubber pellets and biomass plastic pellets were supplied at the mixing ratio as shown in Table 4 by respective quantitative supplying units and kneaded at a screw rotation speed of 400 rpm. The kneading temperature

TABLE 2

| | Composition | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Natural rubber | RSS#1 | 100 | 100 | 100 | 100 | 100 | 100 | 100 | 100 | 100 | 100 | 100 |
| Biomass plastic | LACEA ® H-100 | 30 | 30 | 30 | 30 | 30 | 20 | 30 | 30 | 30 | 35 | |
| | GS Pla | | | | | | | | | | | 30 |
| Rubber crosslinking agent | PERCUMYL ® D-40 | 2 | 2 | 2 | 2 | | 2 | 2 | 2 | 2 | 2 | 2 |
| | VULNOC PM | | | | | 3 | | | | | | |
| Softening agent | Rapeseed refined oil | | 20 | | | | | | | | | |
| | RIKEMAL PL-004 | | | 20 | 20 | 20 | 50 | 70 | 80 | 150 | 100 | 70 |
| Filler | SS#80 | | | | 50 | 50 | 100 | 200 | 250 | 500 | | 200 |
| | Scallop shell powder | | | | | | | | | | 200 | |
| Natural rubber:biomassplastic ratio | | 77:23 | 77:23 | 77:23 | 77:23 | 77:23 | 83:17 | 77:23 | 77:23 | 77:23 | 74:26 | 77:23 |
| Properties | Hardness (C type) | 82 | 73 | 75 | 85 | 82 | 60 | 72 | 70 | 82 | 66 | 82 |
| | Erasing ratio (%) | 81 | 85 | 85 | 90 | 89 | 93 | 92 | 93 | 88 | 93 | 92 | was controlled by setting the cylinder temperature at 120 to 190° C. and the kneaded materials were cut into 3 mm-square pellets.

The obtained composition pellets were extrusion-molded into a square rod-like shape by a uniaxial extruder (cylinder temperature 100 to 120° C., and head temperature 130° C.) and cut into elastomer erasers (size 12×18×43 mm).

The hardness and the erasing ratio of the obtained erasers were measured and evaluated in the same methods as in Examples 1 to 11. The results are shown in Table 4.

TABLE 4

|  |  | Reference Example 1 | Reference Example 2 |
|---|---|---|---|
| Natural rubber | RSS#1 | 100 | 100 |
| Biomass plastic | LACEA ® H-100 | 30 |  |
|  | GS Pla |  | 30 |
| Softening agent | RIKEMAL PL-004 | 70 | 70 |
| Filler | SS#80 | 200 | 200 |
| Rubber crosslinking agent | PERCUMYL ® D-40 | 2 | 2 |
| Natural rubber:bioplastic ratio |  | 77:23 | 77:23 |
| Properties | Hardness (C type) | 72 | 82 |
|  | Erasing ratio (%) | 92.3 | 91.6 |

REFERENCE EXAMPLE 3

Production of Vinyl Chloride Resin Eraser

As shown in Table 5, the vinyl chloride resin, the plasticizer, the filler, and the stabilizer were mixed and stirred to obtain a paste sol. After the obtained paste sol was vacuum defoamed, the paste sol was poured into a metal mold (inner size: 100×100×10 mm) for molding set at 130° C., heated for 26 minutes and cooled, then, taken out of the metal mold, and cut into a vinyl chloride resin eraser (size: 10×18×43 mm).

The hardness and the erasing ratio of the obtained erasers were measured and evaluated in the same methods as in Examples 1 to 11. The results are shown in Table 5.

TABLE 5

| Reference Example 3 | | |
|---|---|---|
| Vinyl chloride resin | ZEST P-21 | 100 |
| Plasticizer | DOP | 160 |
| Filler | NS#400 | 100 |
| Stabilizer | ES-A | 0.5 |
|  | ES-Z | 0.5 |

TABLE 5-continued

| Reference Example 3 | | |
|---|---|---|
| Properties | Hardness (C type) | 60 |
|  | Erasing ratio (%) | 97.7 |

EXAMPLES 12 TO 19

The elastomer erasers obtained in Reference Examples 1 and 2 and the vinyl chloride resin eraser obtained in Reference Example 3 were mixed at mixing ratios shown in Table 6 and kneaded for 5 minutes by a pressurizing kneader set at 120° C. After the obtained compositions were cooled, the compositions were crushed into pellets and the pellets were extrusion-molded into a prescribed shape by a uniaxial extruder and cut to produce erasers (size: 12×18×43 mm)

The hardness and the erasing ratio of the obtained erasers were measured and evaluated in the same methods as in Examples 1 to 11. The results are shown in Table 6.

TABLE 6

|  | Example 12 | Example 13 | Example 14 | Example 15 | Example 16 | Example 17 | Example 18 | Example 19 |
|---|---|---|---|---|---|---|---|---|
| Elastomer eraser of Reference Example 1 (% by weight) | 90 | 70 | 50 | 30 |  |  |  |  |
| Elastomer eraser of Reference Example 2 (% by weight) |  |  |  |  | 90 | 70 | 50 | 30 |
| Vinyl chloride resin eraser of Reference Example 3 (% by weight) | 10 | 30 | 50 | 70 | 10 | 30 | 50 | 70 |
| Properties Hardness (C type) | 72 | 66 | 61 | 60 | 80 | 75 | 69 | 62 |
| Erasing ratio (%) | 92.6 | 94.1 | 95.6 | 97.2 | 92.4 | 93.8 | 95.4 | 96.5 |

As described above, since the elastomer composition of the present invention comprises a biomass plastic derived form biomass and natural rubber as main components, it is an elastomer composition which does not depend on fossil resources and is recycled without increasing carbon dioxide in the atmospheric air even if being discarded and thus it is friendly to the environment and responds to recycling societies. Further, in the case where the elastomer composition of the present invention is used as a base material for an eraser, it is possible to provide an eraser excellent in erasing capability and safety. Further, combination use of a vinyl chloride resin as a base material for an eraser makes it possible to lessen the dependency on fossil resources and at the same time to provide an eraser more excellent in the erasing capability. Moreover, use of a biodegradable biomass plastic as the biomass plastic makes it possible to provide an elastomer composition and an eraser which are provided with further improved environmental friendliness which can be decomposed in natural environments.

The invention claimed is:

1. An eraser made of an elastomer composition containing a matrix of a biomass plastic and crosslinked natural rubber particles dispersed like islands in the matrix of the biomass plastic, wherein the elastomer composition is an eraser composition containing 50 to 99% by weight of natural rubber, 50 to 1% by weight of the biomass plastic, and 0.1 to 5 parts by weight of a rubber crosslinking agent to 100 parts by weight of the natural rubber, and wherein the biomass plastic is at least one kind of compound selected from polylactic acid, polybutylene succinate, polyamide 11, poly-3-hydroxybutyrate, cellulose acetate, esterified starch, chitosan-cellulose-starch and starch-modified polyvinyl alcohol.

2. The eraser of claim 1, wherein the biomass plastic is a biodegradable biomass plastic.

3. The eraser of claim 1, wherein a softening agent is further contained.

4. The eraser of claim 3, wherein the softening agent is derived from biomass.

5. The eraser of claim 3 or 4, wherein the softening agent is selected from animal and plant oils and a plasticizer derived from these oils.

6. The eraser of claim 3, wherein the amount of the softening agent is 1 to 200 parts by weight to 100 parts by weight of the total of the natural rubber and biomass plastic.

7. The eraser of claim 1, wherein a filler is further contained.

8. The eraser of claim 7, wherein the filler is derived from biomass.

9. The eraser of claim 7, wherein the filler is selected from a shell powder and an eggshell powder.

10. The eraser of claim 7, wherein the amount of the filler is 10 to 1000 parts by weight to 100 parts by weight of the total of the natural rubber and biomass plastic.

11. An eraser comprising an elastomer containing a matrix of a biomass plastic and crosslinked natural rubber particles dispersed like islands in the matrix and a vinyl chloride resin, wherein the elastomer is an elastomer eraser composition containing 50 to 99% by weight of natural rubber, 50 to 1% by weight of the biomass plastic, and 0.1 to 5 parts by weight of a rubber crosslinking agent to 100 parts by weight of the natural rubber, and wherein the biomass plastic is at least one kind of compound selected from polylactic acid, polybutylene succinate, polyamide 11, poly-3-hydroxybutyrate, cellulose acetate, esterified starch, chitosan-cellulose-starch and starch-modified polyvinyl alcohol.

12. The eraser of claim 11, wherein the biomass plastic is a biodegradable biomass plastic.

13. The eraser of claim 11, wherein a softening agent is further contained in the eraser.

14. The eraser of claim 13, wherein the softening agent is derived from biomass.

15. The eraser of claim 13 or 14, wherein the softening agent is selected from animal and plant oils and a plasticizer derived from these oils.

16. The eraser of claim 13, wherein the amount of the softening agent is 1 to 200 parts by weight to 100 parts by weight of the total of the natural rubber and biomass plastic.

17. The eraser of claim 11, wherein a filler is further contained in the eraser.

18. The eraser of claim 17, wherein the filler is derived from biomass.

19. The eraser of claim 17 or 18, wherein the filler is selected from a shell powder and an eggshell powder.

20. The eraser of claim 17, wherein the amount of the filler is 10 to 1000 parts by weight to 100 parts by weight of the total of the natural rubber and biomass plastic.

21. The eraser of claim 11, wherein the vinyl chloride resin is a vinyl chloride resin eraser composition containing 100 parts by weight of a vinyl chloride resin and 60 to 180 parts by weight of a plasticizer.

22. A method for producing an eraser comprising the steps of; melting and kneading an eraser of an elastomer eraser composition and an eraser of a vinyl chloride resin eraser composition, and molding the kneaded mixture, wherein the elastomer eraser composition is an elastomer eraser composition containing 50 to 99% by weight of natural rubber, 50 to 1% by weight of a biomass plastic, and 0.1 to 5 parts by weight of a rubber crosslinking agent to 100 parts by weight of the natural rubber, and wherein the biomass plastic is at least one kind of compound selected from polylactic acid, polybutylene succinate, polyamide 11, poly-3-hydroxybutyrate, cellulose acetate, esterified starch, chitosan-cellulose-starch and starch-modified polyvinyl alcohol.

23. The method of claim 22, wherein the vinyl chloride resin eraser composition contains 100 parts by weight of a vinyl chloride resin and 60 to 180 parts by weight of a plasticizer.

24. The method of claim 22, wherein the amount of the eraser of the elastomer eraser composition is 30 to 90% by weight and the amount of the vinyl chloride resin eraser composition is 70 to 10% by weight.

* * * * *